C. J. KIRK.
APPARATUS FOR FORMING ARTICLES OF PLASTIC MATERIAL.
APPLICATION FILED MAR. 3, 1913.
1,156,085.
Patented Oct. 12, 1915.
4 SHEETS—SHEET 1.
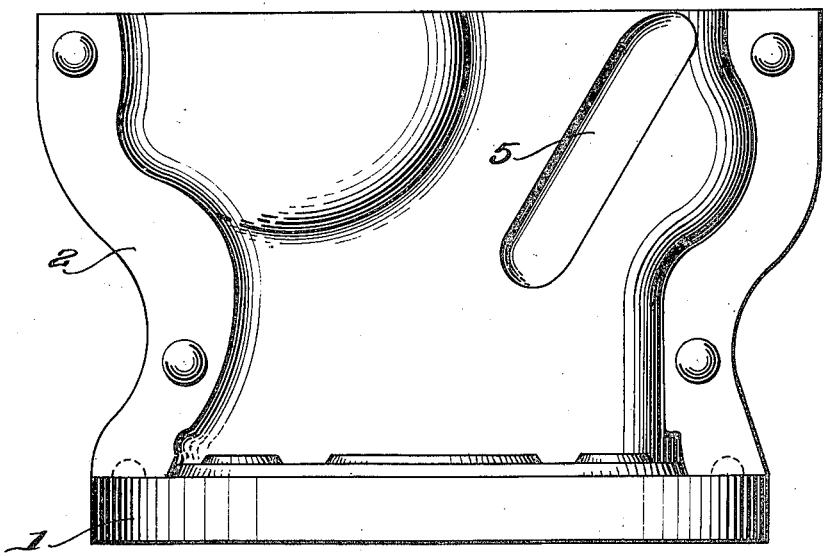
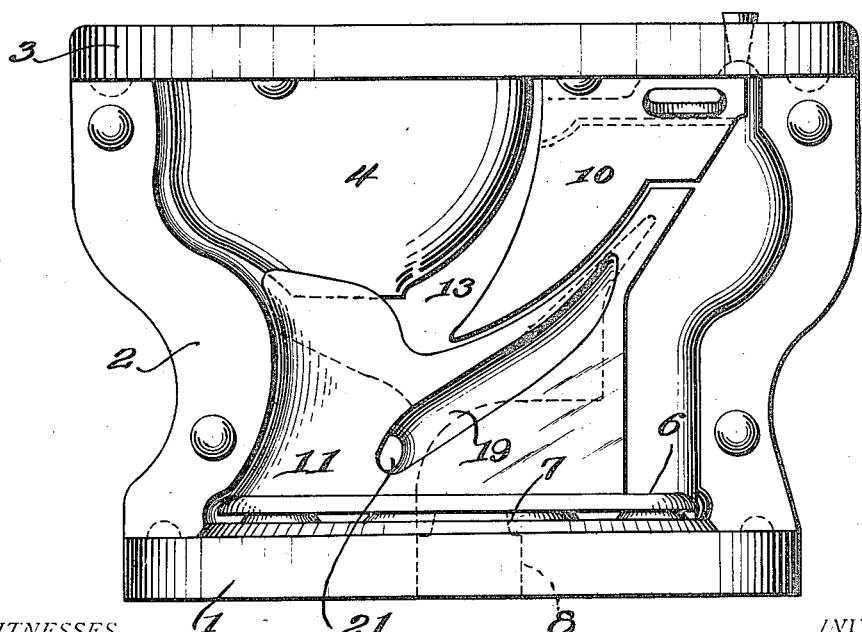

C. J. KIRK.
APPARATUS FOR FORMING ARTICLES OF PLASTIC MATERIAL.
APPLICATION FILED MAR. 3, 1913.
1,156,085.
Patented Oct. 12, 1915.
4 SHEETS—SHEET 2.
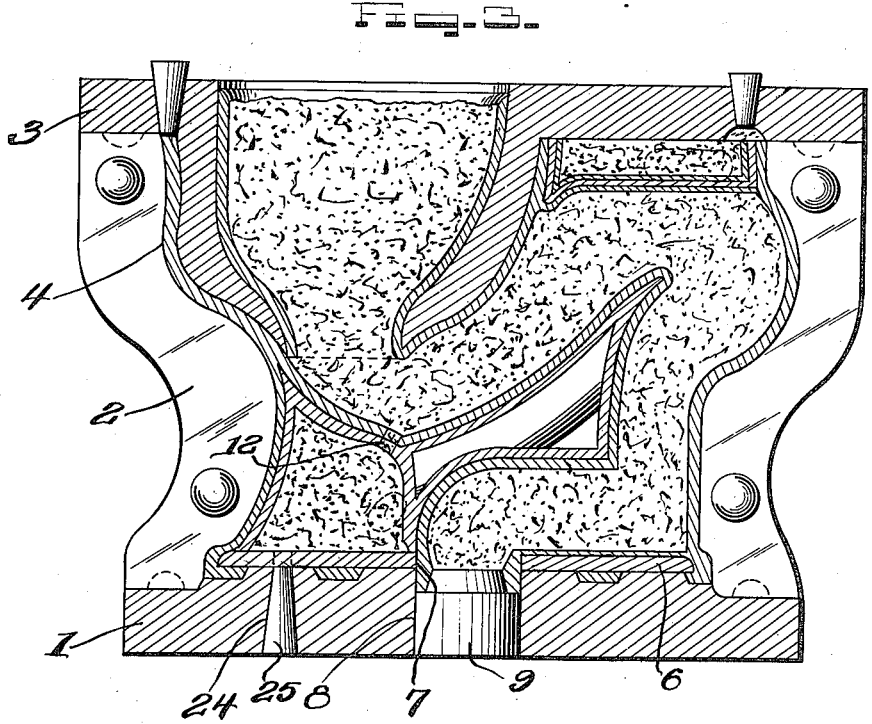
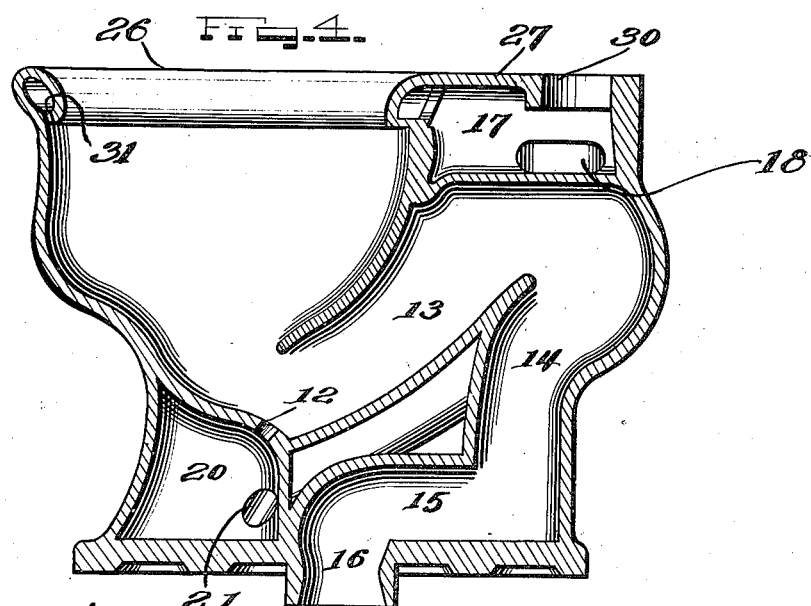
WITNESSES
Jno. R. Woodworth
Caroline Morgan
INVENTOR
Charles J. Kirk,
By Langan Moore
Attorney C. J. KIRK.
APPARATUS FOR FORMING ARTICLES OF PLASTIC MATERIAL.
APPLICATION FILED MAR. 3, 1913.
1,156,085.  Patented Oct. 12, 1915.
4 SHEETS—SHEET 3.
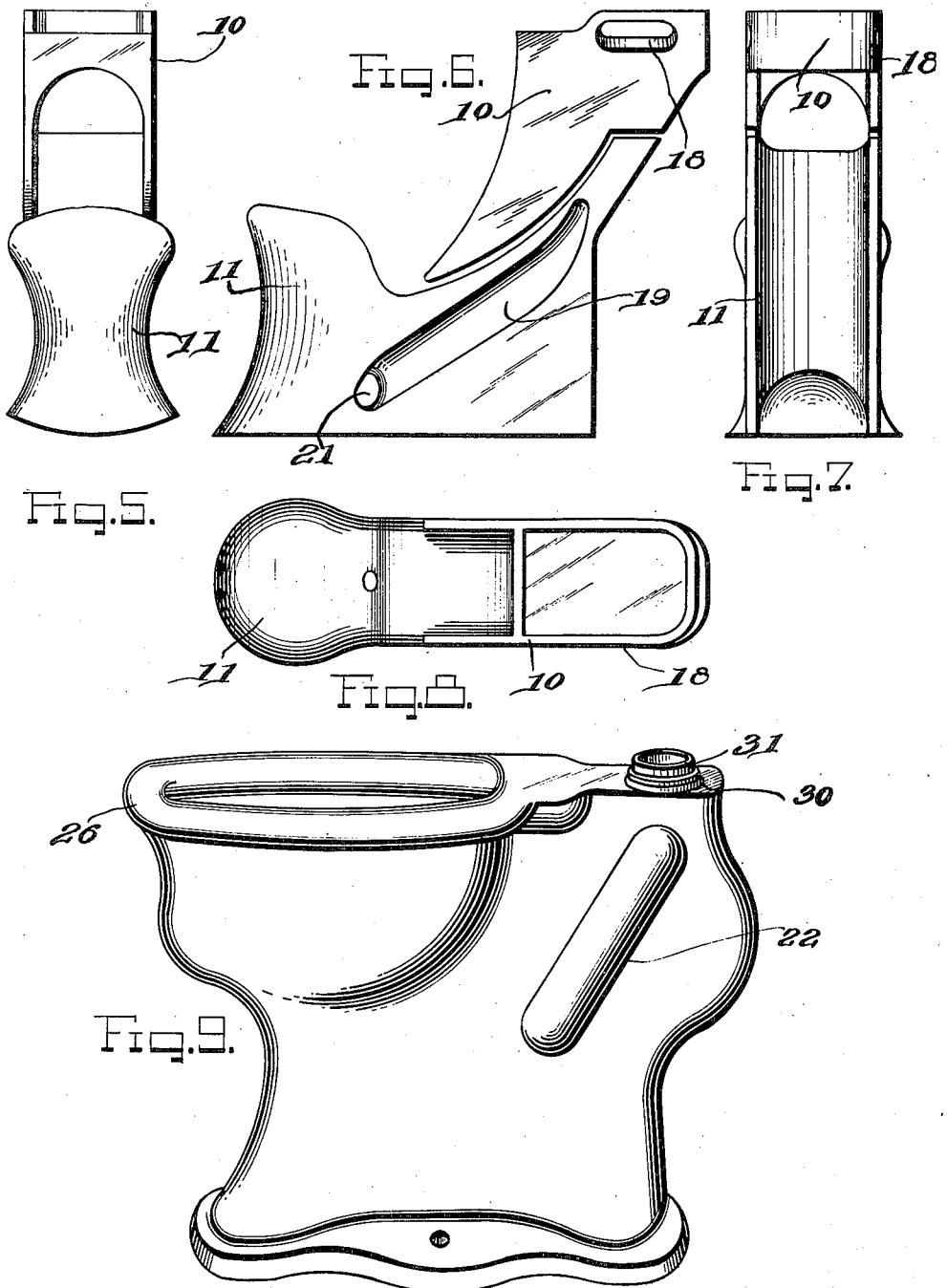

C. J. KIRK.
APPARATUS FOR FORMING ARTICLES OF PLASTIC MATERIAL.
APPLICATION FILED MAR. 3, 1913.
1,156,085.
Patented Oct. 12, 1915.
4 SHEETS—SHEET 4.
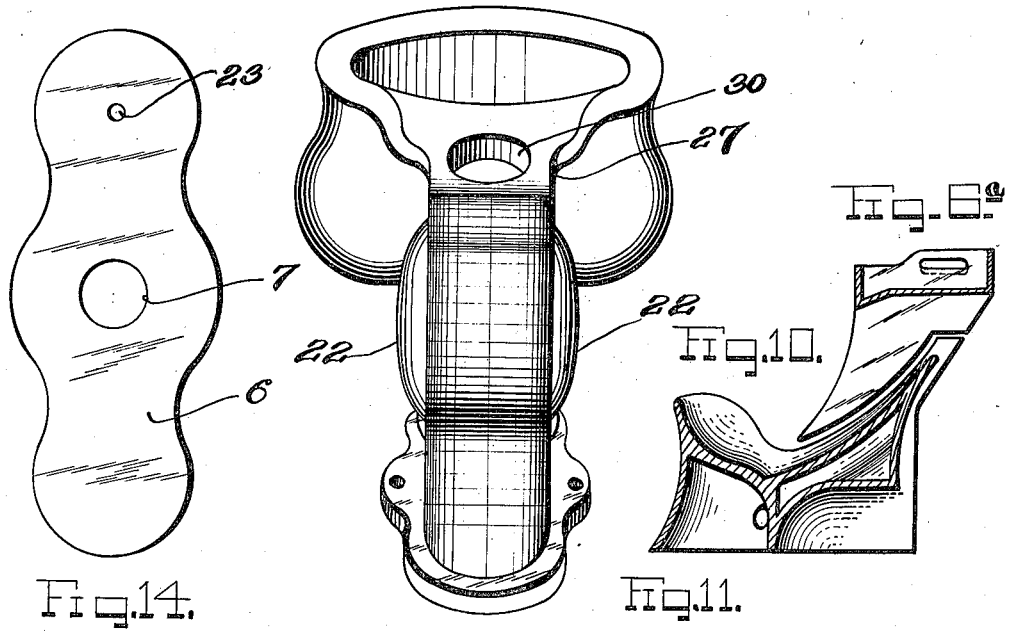
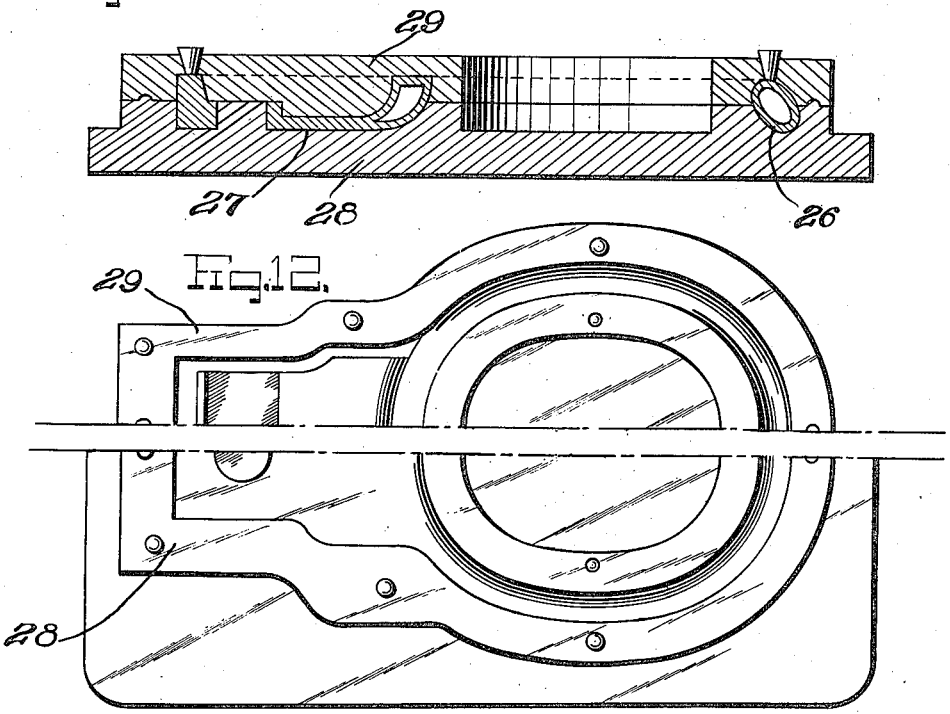

UNITED STATES PATENT OFFICE.

CHARLES J. KIRK, OF NEW CASTLE, PENNSYLVANIA.

APPARATUS FOR FORMING ARTICLES OF PLASTIC MATERIAL.

1,156,085. Specification of Letters Patent. Patented Oct. 12, 1915.

Application filed March 3, 1913. Serial No. 751,871.

*To all whom it may concern:*

Be it known that I, CHARLES J. KIRK, a citizen of the United States, residing at New Castle, in the county of Lawrence and State of Pennsylvania, have invented new and useful Improvements in the Apparatus for Forming Articles of Plastic Material, of which the following is a specification.

This invention relates to an apparatus used in forming articles of plastic material having a plurality of tortuous passages therein, and more particularly to an apparatus used in forming siphon jet water-closets.

The object of this invention is to provide a process by which the water-closet bowl, siphon, and siphon jet passages may be cast at the same time in one piece by one operation.

This invention is an improvement over my prior patented process and apparatus in that this improved process and apparatus makes it possible to cast at the same time in one piece and by one operation siphon jet passages, while in my Patent No. 952,745 of March 22nd, 1910, it was only possible to form the closet bowl and siphon. Heretofore it has been not only difficult to form siphon jet passages requiring skilled labor, but in most cases it has been necessary to form the passage from the spud about the outer walls of the closet proper. By this invention the passage is formed within the closet wall providing a finished article without disfiguring its outline.

While the preferred means for carrying out the process is illustrated upon the accompanying sheets of drawing, yet it is to be understood that the flushing ring may be cast integral with the bowl and the core may be formed in one or more pieces, and minor detail changes may be made without departing from the scope of this invention.

Figure 1 is a view in side elevation of the inner side of one side member of a siphon jet closet mold resting upon the base member of the mold. Fig. 2 is a similar view illustrating the core and core base and top mold member in place. Fig. 3 is a view in longitudinal section through the closet mold illustrating the mold filled with liquid slip just before it is drawn off. Fig. 4 is a view in longitudinal section through a completed closet. Fig. 5 is a view in front elevation of the core. Fig. 6 is a view in side elevation of the core. Fig. 6ᵃ is a view in vertical longitudinal section through the center of the core. Fig. 7 is a view in rear elevation of the core. Fig. 8 is a top plan view of the core. Fig. 9 is a perspective side view of the completed closet. Fig. 10 is a perspective rear view of the completed closet. Fig. 11 is a view in longitudinal section through a flushing ring mold illustrating the flushing ring as formed therein. Fig. 12 is a bottom plan view of the top flushing ring mold member. Fig. 13 is a top plan view of the bottom flushing ring mold member. Fig. 14 is a top plan view of a core base member.

The closet mold comprises a bottom member 1 corresponding to the exterior of the bottom of the finished closet, two symmetrical side members 2 corresponding to the exterior of the sides of the finished closet, and a top member 3 having a depending forming member 4 corresponding to the interior of the finished closet bowl. Each side member is provided with a depression 5 for forming the exterior wall of the jet passage as hereinafter described.

A core base 6 corresponding in outline, but somewhat smaller than the finished base of the closet and having a circular opening 7, is placed upon the base 1 of the mold with the opening 7 corresponding with a similar opening 8 in the mold base for the discharge pipe of the siphon of the closet. The core proper is then placed upon the base 6, the sides 2 and top 3 of the mold placed thereabout and filled through the top member with the closet material in the form of a liquid slip. The core and base having become attached will be held in place by the side molds embracing the top of the base. The opening 8 in the base having been closed by a plug 9, the slip is retained within the mold surrounding the core and forming member 4. The core and core base are cast separately from preferably the same material as is used in the casting of the closet, or from some other material which will contract at about the same rate during the burning and are placed in the mold while still green.

The core may be formed integral or in sections, but is preferably formed in two parts, as illustrated, with the upper part 10 resting upon and forming a continuation of the lower part 11. The sides of the core follow the contour of the sides of the finished closet but of less width so that a space is left between them and the walls of the mold when in place. The upper portion of the lower part 11 at the front is curved to form the bottom of the bowl having a transverse reversed curved portion, in which the siphon jet opening 12 is formed, before extending upwardly toward the rear to form the bottom of the siphon passage 13. The rear of the lower part 11 forms the inner wall of the drop 14 of the siphon passage and the bottom of the core forms the top of the discharge passage 15 extending under the core to the discharge opening 16. The top of the upper portion 10 is closed at the front and rear and joins the rear wall of the bowl in front and the rear closet wall at the back with the closures joined by a partition extending between the side walls forming the floor of the spud or water chamber 17 and the under side forming the top of the siphon passage 13. On each side adjacent the back an elongated horizontal opening 18 for the siphon jet passage is provided above the spud floor. The top of the jet passage opening 18 in the side walls of the spud register with the top of the jet passage recesses 5 in the side mold members. The lower part 11 on each side is provided with a depression 19 gradually increasing in depth toward the bottom until it enters the jet chamber 20 through an aperture 21 below the jet opening in the reversed curve. The jet chamber 20 is formed in the lower part 11 of the core by a partition therein extending between the side walls from the reverse curve to the wall forming the discharge opening 16. The upper portion of the depressions 19 register with the recessed portion 5 of the side mold members, and the depressions 19 in the core, depressions 5 in the walls of the side mold members and the openings 18 in the spud are so constructed and arranged in relation to each other that they form between them a mold for a continuous unobstructed jet passage from the spud through the opening 21 to the forward chamber 29 of the lower core 11 to which the slip adheres in depositing, so that a siphon jet passage is cast within the walls of the finished closet with only the portion 22 formed by the depressions 5 in the side mold members showing to indicate the character of the closet.

The depending mold forming member 4 of the top mold member is hollow with an opening at the bottom and the portion about the upper core part 10 is recessed to allow the slip to enter the spud forming portion of the upper part 10 of the core and enter the siphon jet forming walls and jet chamber 20, as shown in Fig. 3.

When the mold is filled, as shown in Fig. 3, the slip will fill the spud, the siphon jet passage, the spaces between the core and side members, the spaces between the depending bowl forming member 4 and the side member, and the spaces between the core base and side and bottom mold members. As all the members of the mold are porous and as the core is still green a solid deposit of the closet material will be formed thereon, so that after leaving the mold filled for a determined time the plug 9 may be removed and the liquid slip will be discharged. The core base 6 is also provided with an opening 23 corresponding with an opening 24 in the base 1 of the mold, normally closed by a plug 25 which upon removal drains the liquid slip from the jet chamber 20 and thereby also draining the siphon jet passages and spud. The top mold member is removed leaving the core incased and the closet completed with the exception of the flushing ring.

It is preferable to cast the flushing ring 26 and top 27 of the spud in one piece in a separate mold comprising a bottom member 28 having a top surface corresponding in outline to the exterior of the top of the flushing ring and spud top and a top member 29 corresponding in outline to the bottom of said parts, so that as both mold members are composed of a similar material to the closet mold members when filled with liquid slip a deposit is made therein in the same manner forming the top and upper sides of the spud 17 and the flushing ring 26 after remaining a determined length of time and the remaining liquid slip drawn off. The top mold member 29 is then removed and the bottom mold member 28 inverted and placed over the closet mold resting upon the side members 2 thereof with the upper walls of the spud resting upon the side walls of the spud with the flushing ring resting on the top of the closet bowl. The parts are allowed to remain in this position until the flushing ring and spud top have become attached to the closet proper and all parts are sufficiently dry to support themselves, then the mold members are all removed and the cast closet is ready for the burning to form the biscuit before giving a coating of the glaze and again burning to form the complete finished article.

The top 27 of the spud 17 is formed with an opening 30 to receive a pipe connection 31 for attachment to the tank or source of water supply and the discharge openings 32 upon the under side of the flushing ring 26 are made before the ring is placed upon the bowl. The siphon jet opening 12 is preferably formed before the core is placed in the mold.

What I claim is:

1. In a mold for casting siphon jet closets, the combination of the top, side and bottom members conforming with the outer surfaces of the closet, with a core of substantially the same material as the closet conforming to the interior surfaces of the siphon and siphon jet passage walls supported upon the base member and adapted to be covered with a deposit of the closet material and form a homogeneous part of the completed closet.

2. In a mold for casting siphon jet closets, the combination of the top, bottom and side members conforming to the outer surfaces of the closet, with a core of substantially the same material as the closet conforming to the bottom of the intake arm and the top of the discharge arm of the siphon and having a siphon jet passage depression in its side adapted to be covered with a deposit of the closet material and form a homogeneous part of the completed closet.

3. In an earthenware closet mold, top, side and bottom members of porous material conforming to the outer surfaces of the closet, and a permanent inner siphon and siphon jet passage wall forming core of material adapted to be covered with a deposit of the closet material and form an integral part of the completed closet.

4. In a mold for casting siphon jet closets, the combination of the top, side and bottom members conforming to the outer surfaces of the closet and siphon jet passage, with a core of substantially the same material as the closet conforming to the inner surfaces of the siphon, spud, and siphon jet passage from the spud, adapted to be covered with a deposit of the closet material and form an integral part of the completed closet.

5. In a mold for casting siphon jet closets, the combination of the top, side and bottom members conforming to the outer surfaces of the closet and siphon jet passage, with a core of substantially the same material as the closet conforming to the inner surfaces of the siphon, spud, siphon jet chamber, and jet passage way leading from the spud to the chamber, adapted to be covered with a deposit of the closet material and form an integral part of the completed closet.

6. In a mold for casting siphon jet closets, the combination of the top, bottom and side members conforming to the outer surfaces of the closet and siphon jet passage, with a core of substantially the same material as the closet conforming to the bottom of the bowl, inner surfaces of the siphon, and spud, provided with an opening in the spud walls, and a jet chamber under the bowl portion provided with a jet discharge opening therethrough and a jet receiving opening in the side walls, with a depression in the side of the core conforming to the inner surface of the siphon jet passage leading from the opening in the spud to the jet receiving opening in the chamber wall, adapted to be covered with a deposit of the closet material and form an integral part of the completed closet.

7. In a mold for casting siphon jet closets, the combination of the top, side and bottom members conforming to the outer surfaces of the closet and siphon jet passage, with a base of substantially the same material as the closet resting upon the bottom mold member, and a two-part core of the same material, the lower part resting upon the base, the upper surface of which conforms to the bottom of the bowl and bottom and sides of the uptake of the siphon, that end and bottom conforming to the inner surfaces of the remainder of the siphon, having a jet chamber below the bowl portion provided with a jet discharge opening therethrough and jet receiving opening in the side, and a depression in the side of the core leading from the jet receiving opening, the upper part having the side walls resting upon the lower part and forming a continuation thereof with a transverse partition conforming to the top of the uptake and bottom of the spud, the side wall of the spud provided with a jet passage opening, adapted to be covered with a deposit of the closet material and form an integral part of the completed closet.

CHARLES J. KIRK.

Witnesses:
  A. M. PARKINS,
  LANGDON MOORE.